May 19, 1953 R. C. SMITH 2,639,254
METHOD OF MOUNTING 35 MILLIMETER SLIDES TO
PREVENT FILM BUCKLE DURING PROJECTION
Filed Feb. 27, 1951 2 Sheets-Sheet 1
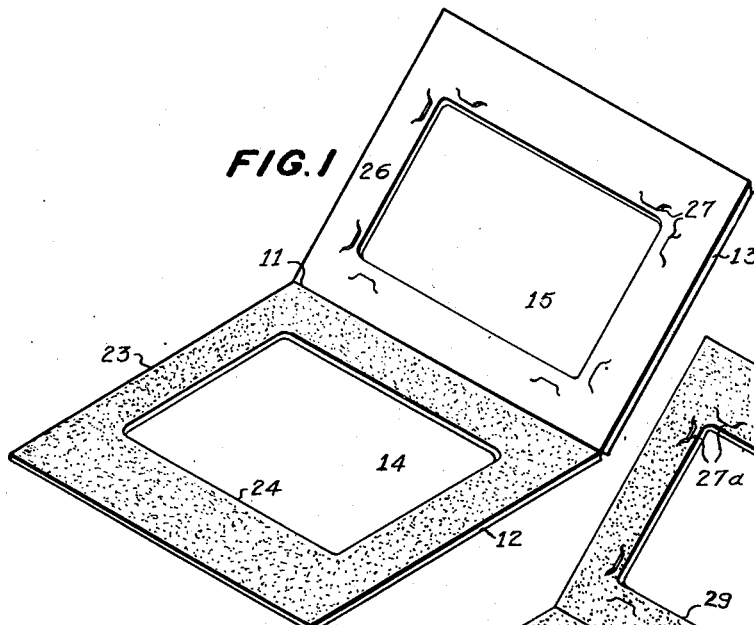
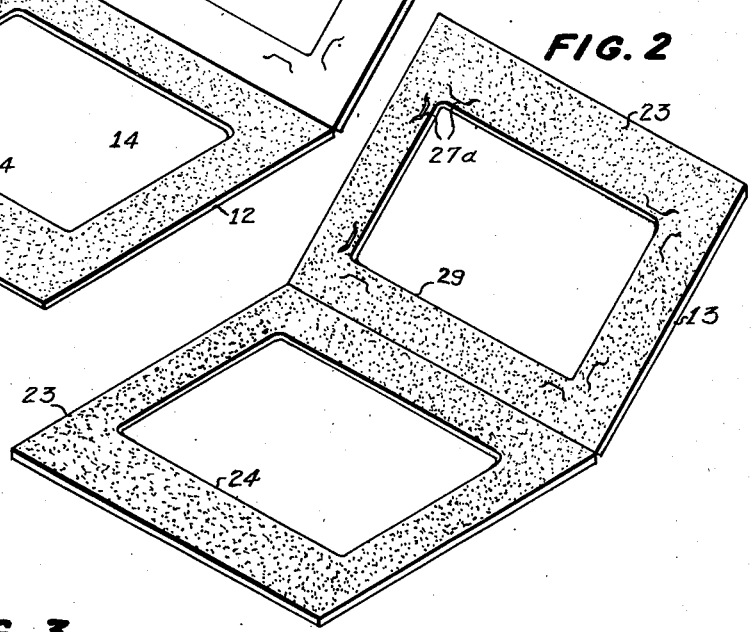
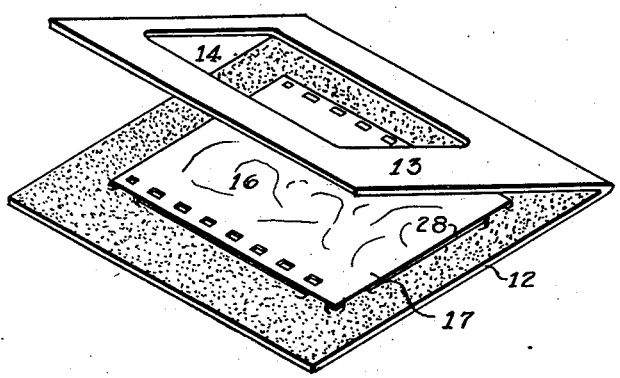
ROBERT C. SMITH
Inventor
Daniel J. Mayne,
J. Griffin Little
Attorneys May 19, 1953 R. C. SMITH 2,639,254
METHOD OF MOUNTING 35 MILLIMETER SLIDES TO
PREVENT FILM BUCKLE DURING PROJECTION
Filed Feb. 27, 1951 2 Sheets-Sheet 2
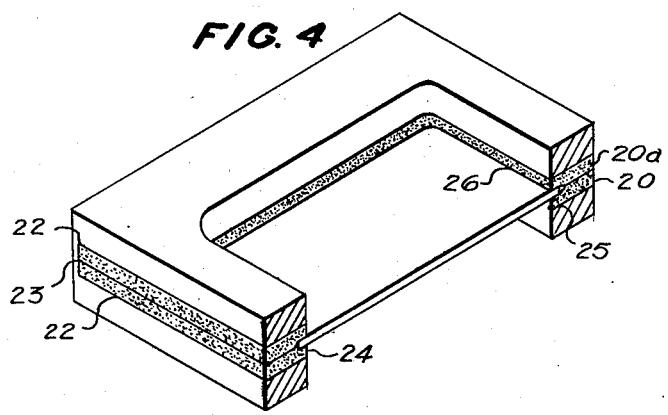
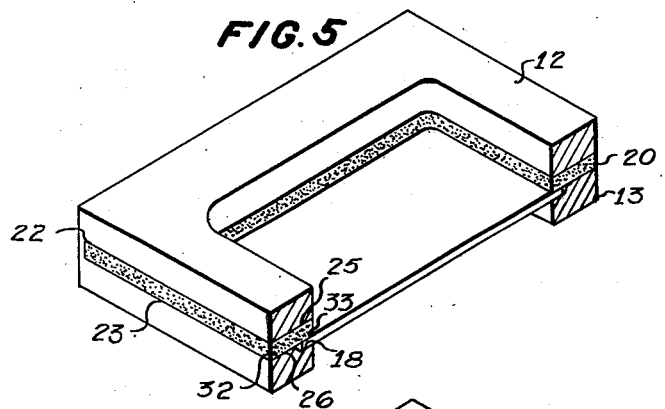
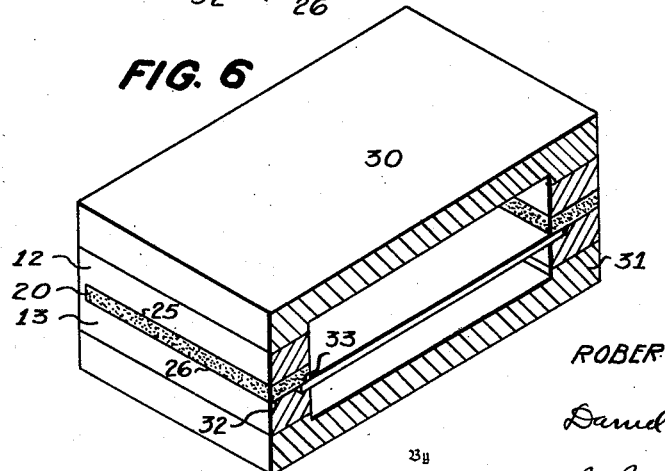
ROBERT C. SMITH
Inventor
By Daniel J. Mayne
J. Griffin Little
Attorneys Patented May 19, 1953

2,639,254

UNITED STATES PATENT OFFICE 2,639,254

METHOD OF MOUNTING 35-MILLIMETER SLIDES TO PREVENT FILM BUCKLE DURING PROJECTION

Robert C. Smith, Rochester, N. Y., assignor to Eastman Kodak Company, Rochester, N. Y., a corporation of New Jersey Application February 27, 1951, Serial No. 212,868

11 Claims. (Cl. 154—116)

1

The present invention relates to transparency mounts, and more particularly to a method of securing the transparency in the mount to prevent buckling or warping during projection.

In one type of mount now on the market, the mount is formed from a single piece of cardboard which is scored along its center line to provide two hinged flaps or members which are adapted to be arranged in overlapping relation with the transparency positioned or sandwiched therebetween. The members are provided with registering apertures which are of such size as to frame the image area of the transparency. The balance of the transparency extends beyond the edges of the apertures and is supported by sections of the members surrounding the apertures. The members are of larger dimensions than the transparency so as to extend beyond all sides of the latter, as is well known.

In some prior methods of mounting, heat and pressure are applied to the mount to cause the mount parts to adhere. Such heating may tend to raise the temperature of the transparency. However, as such heat and pressure are not used to anchor the transparency in position in the mount, the transparency is free and floating. The result is that when the transparency cools, it will shrink and will be positioned loosely between the mount parts. Accordingly, when this loosely positioned transparency is heated during projection, it will expand and such expansion will cause the transparency to buckle and snap out of focus. The out-of-focus relation is highly undesirable for obvious reasons.

In order to overcome these undesirable features, the present invention provides a method of mounting which will insure that the transparency will remain flat and in focus during projection. To secure this result the transparency is preheated before securing in place in the mount; and, while still in its heated condition, is adhered in place in the mount and sealed along all four edges to secure the heated transparency in fixed position on the mount members. This heat is of such intensity as will heat the transparency substantially to the temperature it will attain while being projected. This preheating will serve to expand the transparency substantially to its projection dimensions. The expanded film is then sealed in the mount in a manner to be later described. As the transparency cools to its normal or room temperature it will shrink, but as it is sealed along all four edges such shrinking is restricted, so that a tension will be set up in the transparency. However, when the mount is in

2 position for projection, the transparency will be subjected to the heat rays of the projection lamp and will be reheated substantially to the same temperature at which it has been previously mounted. The result is that the transparency will be returned to its mounting condition, and will not be subjected to any strains so that it will remain flat and will not buckle or snap out of focus, the advantages of which are deemed apparent. Thus, this preheating the mount, and securing of the transparency along all edges while in its heated condition, will insure that the transparency will be maintained in focus during projection.

The present invention has as its principal object, the provision of a transparency mount in which the transparency will not buckle or snap out of focus during projection.

Another object of the invention is the provision of a method of preheating a transparency substantially to the temperature to which it will be subjected during projection, so that the transparency will not buckle or bend, under the influence of the projecting light.

Yet another object of the invention is the idea of sealing the preheated transparency while still in its heated condition along the four edges so that during projection the transparency will be in exactly the position it occupied when initially heated so as to eliminate buckling or bending during projection.

Still another object of the invention is the provision of a method for mounting a transparency which is easy, simple, and highly effective in use.

To these and other ends, the inventive idea resides in certain improvements and combinations of parts, all as will be hereinafter more fully described, the novel features being pointed out in the claims at the end of the specification.

In the drawings:

Fig. 1 is a perspective view of a single insert mount in which the preheated film or transparency of the present invention is positioned and sealed;

Fig. 2 is a view similar to Fig. 1, but showing a double insert type of mount;

Fig. 3 is a view of the mount illustrated in Figs. 1 and 2, in the partly closed position, and with the transparency mounting therein.

Fig. 4 is a vertical sectional view through the double insert mount showing the relation of the parts and the arrangement for sealing the transparency in position in the mount;

Fig. 5 is a view similar to Fig. 4 but with the single insert mount showing the relation of the parts and the manner of sealing the transparency in position in the mount; and Fig. 6 is a sectional view through heated clamping jaws which serve to seal the two mount members, and to seal the transparency along all four edges to one of the mount members.

Similar reference numerals throughout the same views indicate the same parts.

The drawings show a transparency mount formed from a strip of sheet material, such as cardboard, which is scored along its center line 11 providing a pair of flap members 12 and 13 which are adapted to be arranged in overlapping relation as shown in Figs. 3, 4 and 5. The flaps 12 and 13 are provided with apertures 14 and 15 which are arranged in registering relation when the mount is in a folded position, and which frame the image areas 16 of the transparency 17 positioned or sandwiched between the flaps, as is deemed apparent. The portion 18 of the transparency outside the image area 16 rests on and is supported by the portions of the flaps surrounding the apertures 14 and 15, in a well known manner.

The mount illustrated in Fig. 1 is provided with an insert 20 which may be formed, for example, from a sheet of kraft paper approximately .005" in thickness and having the opposite sides 22 and 23 thereof coated with layers of adhesive of the type which softens under heat and pressure, such, for example, as "Vinylite". The insert 20 is substantially equal in size to flap 12, and is formed with an aperture 24 which registers with aperture 14. To position the insert 20, the side 22 thereof is moistened with a suitable solvent, such as alcohol, and pressed against the inner face 25 of flap 12 and adhered thereto. The parts are then in the position shown in Fig. 1. It was found after extensive tests that if the base side of the transparency is placed on the side 23 of the insert 20, the transparency would not readily adhere thereto during sealing, as will be later described, so that when the transparency is projected the transparency would still tend to warp or buckle. However, this warping is eliminated if the emulsion side of the transparency is positioned on and adhered to the side 23 of the insert 20, as will be later more fully described.

To facilitate proper positioning of the transparency on the mount to register the image area 16 with the apertures 14 and 15, the flap 13 may be provided with pairs of upstruck lugs or ears 27 spaced from the edges of the aperture 15 and adapted to engage edges 28 of the transparency 17 adjacent the four corners thereof, as illustrated in Fig. 3. When the flaps 12 and 13 are folded, the lugs 27 may be pressed back into the body of the flap 13. If desired, the lugs 27 may be formed in member 12 and insert 20, so that the transparency may be positioned directly on member 12, as shown in Fig. 3.

Fig. 2 shows a slightly modified mount structure in which the flap 13 is also provided with a double adhesive coated insert 20a, identical with insert 20, and provided with an aperture 29 which registers with aperture 15; parts corresponding to insert 20 are designated by the same numerals. One side 22 of the insert 20a is moistened with alcohol and attached or adhered to the inner face 26 of flap 13. The latter, and insert 20a may have lugs 27a formed therefrom adapted to engage the edges 28 of the transparency. The structure shown in Fig. 2 may be designated as a "double" insert type of mount, while that shown in Fig. 1 may be specified as the "single" insert type. Obviously, with a double insert arrangement, the transparency may be positioned in the mount with the emulsion side of the transparency facing either insert 20 or 20a. However, because of the thinner structure of the single mount type, the latter is preferred because it facilitates handling in the automatic mount changing devices.

With the transparency in position between the flaps, and with either the "single" or "double" insert type structure, the mount is placed between a pair of heated jaws 30 and 31, which are the shape shown in Fig. 6, so as to engage the outer surfaces of the flap members 12 and 13 over the areas thereof outside the apertures 14 and 15. When in their open or inoperative position, the jaws are spaced about ¼" apart so that the folded mount with its positioned transparency may be easily and readily slipped into position between the open jaws. The mount is retained between the open jaws for a few seconds so as to preheat the transparency to an elevated temperature, which is substantially equal to that it will attain when in projecting position in the projector. After this initial preheating, the jaws 30 and 31 are moved to clamping relation to apply both heat and pressure over the entire area of the mount outside the apertures 14 and 15.

With the single insert type of mount, Figs. 1 and 5, this final heating and clamping will melt or soften the "Vinylite" coating on the face 23 of insert 20 to cause the portion 32 on side 23 outside the transparency to engage adhesively the exposed portion of the inner face 26 of the opposite flap 13 to adhere the flaps together. In addition, the portion 33 of insert 20, which overlies the emulsion coated portion 18 of the transparency, will be adhered to the emulsion coating to seal the transparency along all its four edges to the face 23 of the insert 20.

In the case of the double insert arrangement, Figs. 2 and 4, the final heating and clamping will cause the portion 32 of the faces 23 of the two inserts 20 and 20a to adhere together to connect the flaps 12 and 13 in assembled relation; while the portion 33 of insert 20 will be adhered to portion 18 of the transparency to seal the latter along all its edges to the insert. With both arrangements, the entire portion or area 18 of the transparency outside the apertures 14 and 15 has the emulsion side thereof adhered to the adjacent face of the insert to secure or seal the transparency along all four edges to the insert. Also, the members 12 and 13 are sealed along all four edges outside or beyond the transparency.

This sealing of the transparency and the mount parts is performed while the transparency is maintained in its heated and expanded condition. After the sealing is completed, the jaws 30 and 31 are retracted and the sealed mount is removed and allowed to cool. Such cooling will tend to shrink the transparency, but as the latter is sealed or anchored along all four edges, such shrinking is prevented and the cooled transparency will be under tension. However, when the sealed mount is placed in projecting position in the projector, the heat rays of the projection light will again heat the transparency substantially to the temperature to which it was heated when mounted, so that the transparency will be returned to its mounting condition. The result is that it will not be under any strain and will not buckle or snap out of focus. Thus, by preheating and sealing the transparency while preheated will insure that the transparency will remain flat and in focus when being projected.

While certain embodiments of the invention have been described, it is to be understood that the inventive idea may be carried out in a number of ways. This application is, therefore, not to be limited to the precise details described, but is intended to cover all variations and modifications thereof which fall within the scope of the appended claims.

What I claim and desire to secure by Letters Patent of the United States is:

1. A method of mounting a transparency in a mount composed of a pair of apertured members adapted to be arranged in overlying relation with said apertures in registry to frame an image area of a transparency, at least one of said members being adhesively coated, comprising, in combination, positioning said transparency on one of said members with the image area in registry with the aperture thereof, preheating said transparency, and then sealing the edges of said transparency while still heated to said coated member.

2. A method of mounting a transparency in a mount composed of a pair of apertured members adapted to be arranged in overlying relation with said apertures in registry to frame an image area of a transparency, at least one of said members being adhesively coated, comprising, in combination, positioning said transparency on one of said members with the image area in registry with the aperture thereof, preheating said transparency and then simultaneously sealing said heated transparency along all edges to said coated member and sealing said members together.

3. A method of mounting a transparency in a mount composed of a pair of apertured members adapted to be arranged in overlying relation with said apertures in registry to frame an image area of a transparency, at least one of said members being adhesively coated, comprising, in combination, positioning said transparency on one of said members with the image area in registry with the aperture thereof, applying heat to the entire surface of said mount outside said apertures first to preheat said transparency to a temperature substantially equal to that to which the transparency will be heated during projection, and then simultaneously adhering the transparency along the full length of all its edges to said coated members, and then adhering the members together outside said transparency.

4. A method of mounting a transparency in a mount composed of a pair of apertured members adapted to be arranged in overlying relation with said apertures in registry to frame an image area of a transparency, at least one of said members being adhesively coated, comprising, in combination, positioning said transparency on one of said members with the image area in registry with the aperture thereof, applying heat to the entire surface of said mount outside said apertures to preheat said transparency to a temperature substantially equal to that to which the transparency will be heated during projection, and then applying pressure and heat to the mount outside said apertures to adhere said transparency while still heated along all edges to the coated member and simultaneously to adhere said members together.

5. A method of mounting a transparency in a mount composed of a pair of apertured members adapted to be arranged in overlying relation with said apertures in registry to frame an image area of a transparency, at least one of said members being adhesively coated, comprising, in combination, positioning said transparency on one of said members with the image area in registry with the aperture thereof, applying heat to the entire surface of said mount outside said apertures to preheat said transparency to a temperature substantially equal to that to which the transparency will be heated during projection, applying pressure and heat to the mount surfaces outside said apertures to adhere the entire portion of said heated transparency between the outer edges of said transparency and the edges of said apertures to said coated member, and then securing the outer portions of the members beyond said transparency.

6. A method of mounting a transparency in a mount composed of a pair of apertured members adapted to be arranged in overlying relation with said apertures in registry to frame an image area of a transparency, at least one of said members being adhesively coated, comprising, in combination, positioning said transparency on one of said members with the image area in registry with the aperture thereof, and with the emulsion side of said transparency in engagement with said coated member outside said apertures, applying heat to the entire surfaces of said mount outside said apertures to preheat said transparency to an elevated temperature, and then applying heat and pressure over said surfaces to adhere said emulsion side to said coated member while the transparency is maintained at said elevated temperature and simultaneously engaging said members beyond said transparency to secure the members together.

7. A method of mounting a transparency in a mount composed of a pair of apertured members adapted to be arranged in overlying relation with said apertures in registry to frame an image area of a transparency, providing an apertured double adhesive coated insert, positioning said insert on the inner surface of one of said members with the aperture of said insert in registry with the aperture of said one member, adhering one side of said insert to said inner surface, placing said transparency on the other side of said insert with the image area in registry with the aperture thereof, heating said positioned transparency to an elevated temperature, adhering the entire area of said transparency outside said image area to said other side of said insert while said transparency is heated, and then securing said mount members together.

8. A method of mounting a transparency in a mount composed of a pair of apertured members adapted to be arranged in overlying relation with said apertures in registry to frame an image area of a transparency, providing an apertured double adhesive coated insert, positioning said insert on the inner surface of one of said members with the aperture of said insert in registry with the aperture of said one member, adhering one side of said insert to said inner surface, placing the emulsion side of said transparency against the other side of said insert with the imaged area in registry with the aperture of said mount, preheating said transparency to an elevated temperature, adhering the entire periphery of the emulsion side of said transparency while heated to said other side of said insert surrounding the aperture thereof, and then adhering said members together beyond said transparency.

9. A method of mounting a transparency in a mount composed of a pair of apertured members adapted to be arranged in overlying relation with said apertures in registry to frame an image area of a transparency, providing an apertured double adhesive coated insert, positioning said insert on the inner surface of one of said members with the aperture of said insert in registry with the aperture of said one member, adhering one side of said insert to said inner surface, placing the emulsion side of said transparency against the other side of said insert with the imaged area in registry with the aperture of said mount, applying heat to the other surfaces of said mount members outside the apertures thereof to preheat said transparency to an elevated temperature, and then applying heat and pressure to adhere the entire periphery of the emulsion side of said transparency outside the image area to the portion of said other side of said insert outside the aperture thereof and to adhere the portion of said other side of said insert beyond said transparency to the inner surface of the other member to adhere said members together outside said transparency.

10. A method of mounting a transparency in a mount composed of a pair of apertured members of a larger size than said transparency and adapted to be arranged in overlying relation with said apertures in registry to frame an image area of said transparency, comprising, in combination, providing an apertured double-adhesive coated insert of a size equal to said members positioning said insert against the inner surfaces of one of said members with the aperture of said insert in registry with the aperture of said one member, said insert covering the entire surface of said one member outside the aperture thereof, adhering one side of said insert to said inner surface of said one member, placing the emulsion side of said transparency on the other side of said insert, positioning said transparency on said one side with the image area in registry with the aperture of said one member and with the marginal area of said transparency outside said image area supported on the portion of said one side surrounding the aperture thereof, the insert and said one member projecting beyond the edges of said transparency, applying heat to said member outside the apertures thereof to preheat said transparency to an elevated temperature, and then applying heat and pressure to the surface of said mount outside the apertures thereof to adhere the portion of the emulsion side of said heated transparency surrounding said image area to the supporting portion of said insert to adhere all edges of said transparency while still heated to said insert and to adhere the balance of said one side of said insert outside said transparency to the inner surface of the other member to connect said members adhesively.

11. A method of mounting a transparency in a mount composed of a pair of apertured members of a larger size than said transparency and adapted to be arranged in overlying relation with said apertures in registry to frame an image area of said transparency, comprising, in combination, providing a pair of apertured double adhesive coated inserts commensurate with said members, positioning one side of each insert against an inner surface of one of said members with the apertures of said inserts in registry with the apertures of said members, adhering said inserts to said inner surfaces, placing said transparency on the other side of one of said inserts with the image area in registry with the aperture of said last insert and the aperture of the adjacent member and with the portion of said transparency surrounding said image area being supported by the section of said other side of said insert surrounding the aperture thereof, said inserts and members extending beyond the edges of said aperture, applying heat to said members outside the apertures thereof to preheat said transparency to an elevated temperature while positioned in said mount, and then applying heat and pressure to the entire surfaces of said mount outside said apertures to adhere said portion of said transparency to the supporting section to adhere said transparency along all edges thereto and to adhere the other sides of said inserts beyond the edges of said transparency to connect and seal said mount along all edges.

ROBERT C. SMITH.

References Cited in the file of this patent

UNITED STATES PATENTS

| Number | Name | Date |
|---|---|---|
| 2,184,007 | Staehle | Dec. 19, 1939 |